May 20, 1958     H. M. LATHAM     2,835,068
ARTIFICIAL FISH LURES
Filed Oct. 25, 1957     2 Sheets-Sheet 1
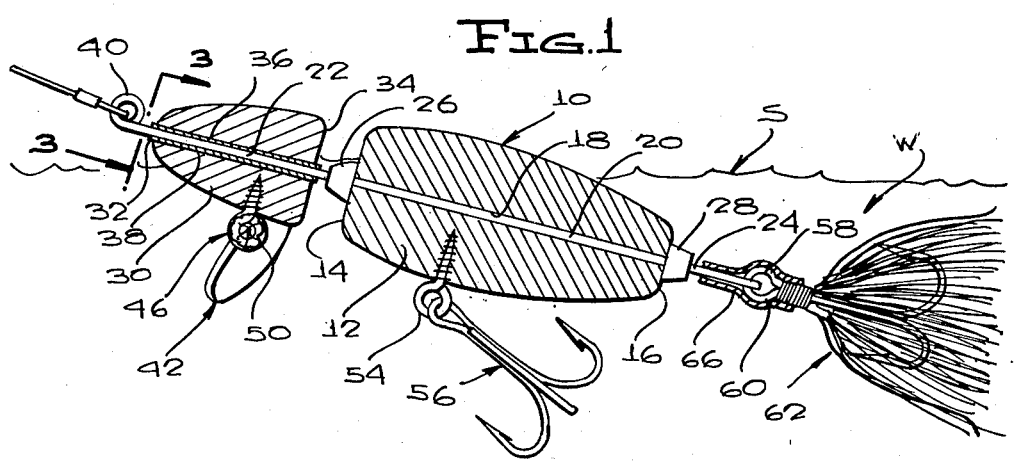
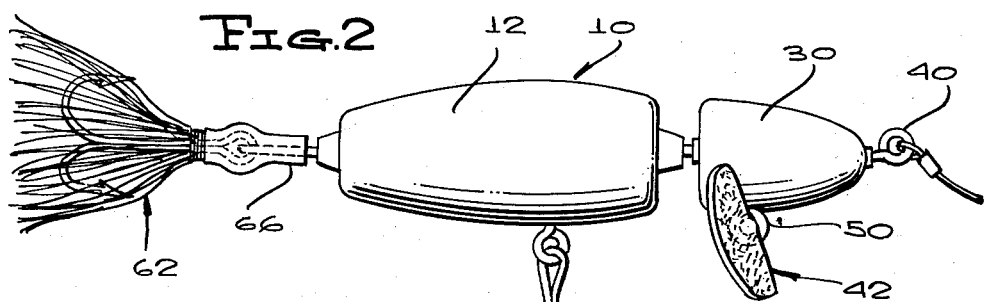
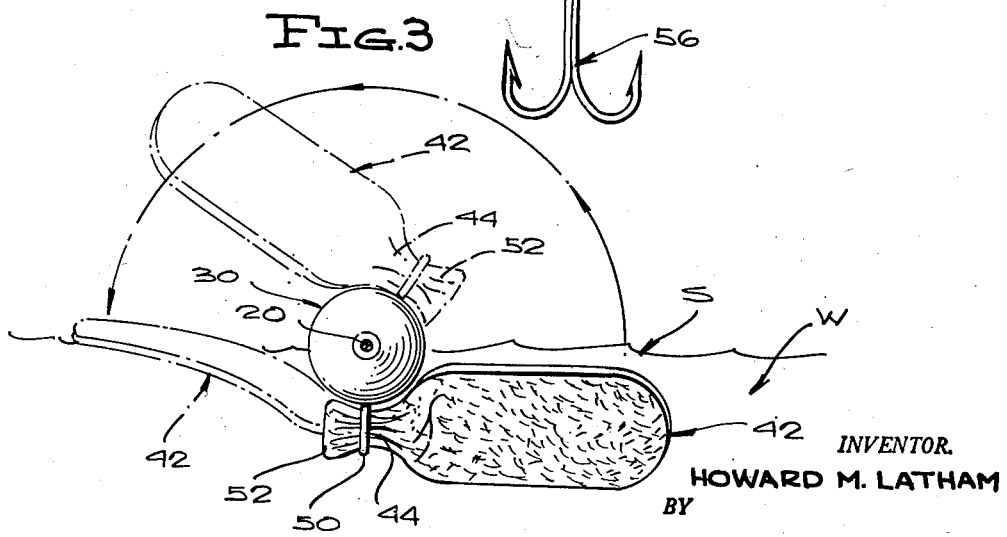
INVENTOR.
HOWARD M. LATHAM
BY
*McMorrow, Berman & Davidson*
ATTORNEYS May 20, 1958
H. M. LATHAM
2,835,068
ARTIFICIAL FISH LURES
Filed Oct. 25, 1957
2 Sheets-Sheet 2
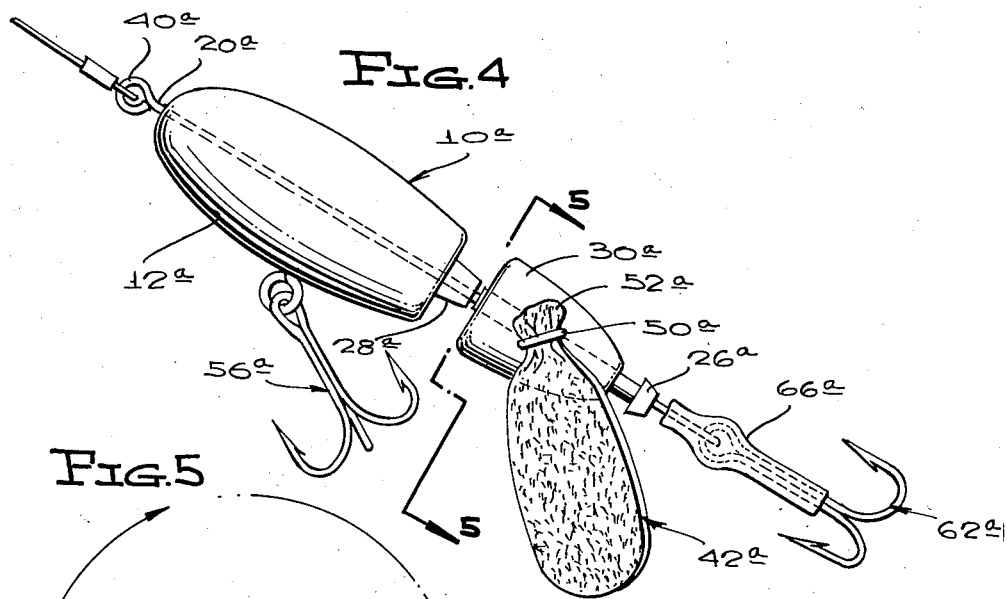
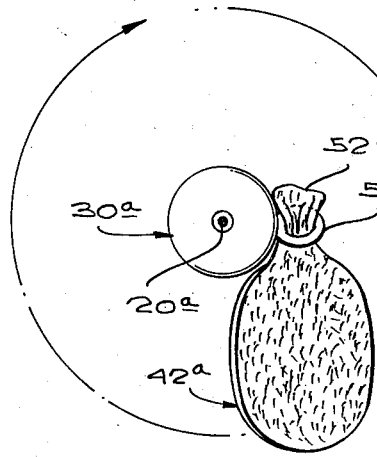
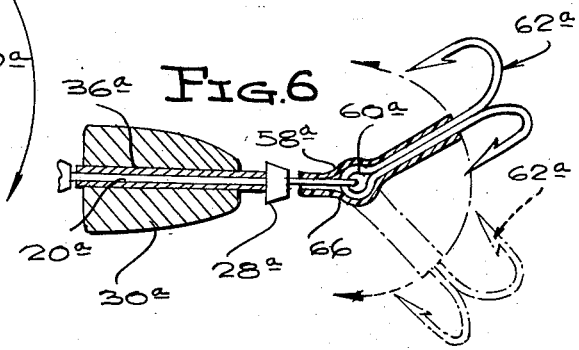
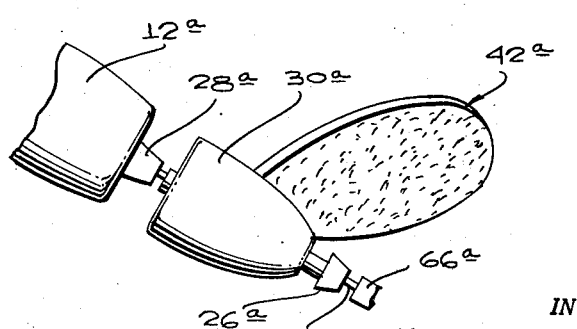
INVENTOR.
HOWARD M. LATHAM
BY
McMorrow, Berman & Davidson
ATTORNEYS United States Patent Office 2,835,068
Patented May 20, 1958

2,835,068

ARTIFICIAL FISH LURES

Howard M. Latham, Devils Lake, N. Dak.

Application October 25, 1957, Serial No. 692,439

2 Claims. (Cl. 43—42.16)

This invention relates to improvements in artificial fish lures of the head-spinner and tail-spinner types for use in surface and underwater fishing.

The primary object of the invention is to provide more effective lures of the types indicated above which embody on their spinner components single, relatively large, and relatively soft and flexible blades, which act to rotate the spinner components, as the lures are drawn along, and to produce sidewise and undulating motions of the lures which simulate those of live bait; and which, in surface fishing, produce slapping noises on the surface of the water, and, in underwater fishing, produce commotions of the water, resembling those produced by live bait, whereby fish are attracted strongly to the lures.

Another object of the invention is to provide fish lures of the character indicated above, which can be made in various attractive, rugged, and serviceable forms, from a variety of materials, at relatively low cost.

Other important objects and advantageous forms of the invention will be apparent from the following description and the accompanying drawings, wherein, for purposes of illustration only, a specific form of the invention is set forth in detail.

In the drawings:

Figure 1 is a longitudinal section taken through a head-spinner type of lure of the invention, showing the same in use for surface fishing on the surface of a body of water;

Figure 2 is a side elevation of the lure of Figure 1;

Figure 3 is a transverse section taken on the line 3—3 of Figure 1, showing in phantom lines rotation of the head component and its single blade in producing a slapping noise by the blade on the surface of a body of water;

Figure 4 is a side elevation of a tail-spinner type of lure of the invention;

Figure 5 is a transverse section, taken on the line 5—5 of Figure 4, with arrows indicating rotation of the tail component and its single blade;

Figure 6 is a horizontal longitudinal section taken through the tail component of Figure 4 and its hook assembly; and Figure 7 is a fragmentary elevation of the opposite side of the lure from that shown in Figure 4.

Referring in detail to the drawings, wherein like or similar numerals designate like parts throughout the several views, and first to Figures 1 to 3 thereof, the lure therein illustrated, and generally designated 10, comprises an elongated, cigar-shaped body component 12, made of wood or other buoyant material, having a squared front end 14 and a squared smaller rear end 16. Extending axially through the body component 12 is a bore 18 through which extends a rod 20 which is longer than the body component 12. The rod 20 has a forward portion 22 extending forwardly beyond the body component 12, and a rear portion 24 extending rearwardly beyond the body component 12. Conical front and rear spacers 26 and 28, respectively, are secured on the rod 20 at the front and rear ends of the body component.

The lure 10 further comprises a forwardly tapered head spinner component 30 having a preferably rounded front end 32 and a squared larger rear end 34. Extending axially through the head component 30 is an axial bore 36 in which is secured a bearing sleeve 38 which is journaled on the forward portion 22 of the rod 20 between, and slightly spaced from the front spacer 26 and a fishing line attaching eye 40 on the forward end of the rod 20.

A single, elongated flexible paddle-shaped blade 42, made of such as soft rubber, has on one end thereof a reduced width and elongated tab 44 by which it is secured to the head component 30. A loop, such as an eye 46, has its shank 48 secured in the head component near to and spaced from its rear end 34, so that its eye ring 50 projects radially outwardly from the side of the head component 30 and is in a plane intersecting the longitudinal axis of the head component. The tab 44 of the single blade 42 is compressed and is passed through the eye ring 50 and its terminal end 52 permitted to expand and act as a retainer for securing the single blade 42 to the head component 30 in laterally extending, generally tangential relation thereto, the blade 42 being free to rotate on its longitudinal axis in the eye ring 50, as well as flex and swing relative to the eye ring. The blade 42 is initially disposed at an angle to the axis of the head component 30, as shown in Figures 1 and 2, so as to have propeller action on the water and produce rotation of the head component 30, as the lure 10 is drawn forwardly in water.

The lure 10 is especially adapted to surface fishing, wherein the lure 10 is pulled along the surface S of a body of water W, and the head component 30 at times rides above the surface S, so that in rotating the blade 42 slaps down upon the surface S, as indicated in Figure 3, and produced fish-attracting slapping noises.

The body component 12 may have swivelly secured to its underside, as indicated at 54, a depending fish hook assembly 56.

The rear end portion 24 of the rod 20 terminates at its rear end in an eye 58, through which is engaged an eye 60 on the forward end of a multiple fish hook assembly 62 whereby the assembly 62 is free to swing laterally in trailing relation to the body component 12. For holding the assembly 62 yieldably in line with the rod 20, there is circumposed on and secured to the rear end rod portion 24 behind the rear spacer 28 and on the shank of the assembly 62, a flexible and resilient sleeve 66, which encloses also the eyes 58 and 60. This arrangement enables the hook assembly 62 to swing laterally only during major lateral movements of the lure 10, while under other conditions maintaining the assembly 62 in line with the lure, so that the assembly 62 is always in effective fish-hooking position.

The form of the invention shown in Figures 4 to 7, and generally designated 10a, is especially suitable for underwater fishing, and is suitably less buoyant than the lure of Figures 1 to 3. The body component 12a and the head component 30a are similar to those of Figures 1 to 3, except that the positions thereof are reversed on the rod 20a, so that the component 30a is behind the body component 12a and serves instead as a tail spinner component, carrying the single blade 42a which is similar to and arranged on the tail component 30a like the blade 42 of Figures 1 to 3.

Rotation of the tail component 30a by the blade 42a as the lure 10a is drawn forwardly through and below the surface S of a body of water W, produces commotions in the water resembling swimming activities of live bait which attract fish to the lure 10a.

As shown in the drawings, the single blades 42 and 42a are relatively wide and long, being permissibly substantially as long as the body components 12 and 12a and as wide. This large size of the single blades is effective to produce life-like lunges and flappings of the blades relative to the lures and life-like gyrations of the lures which closely simulate gyrations of live fish.

Although I have shown and described herein specific forms of the invention, it is to be understood that any change or changes in the forms of and in the relative arrangements of the components are contemplated as being within the spirit and scope of the invention as defined by the claims appended hereto.

What is claimed is:

1. An artificial fish lure comprising a body component having an axial bore therethrough, a rod extending through said bore, said rod having first and second end portions projecting beyond related ends of the body component, a spinner component having an axial bore extending therethrough rotatably receiving one of said rod end portions, a single relatively long flexible blade having an inward end provided with a reduced width tab, said tab being compressingly extended through a fastening element extending laterally outwardly from the spinner component, and a trailing fish hook assembly secured on an end of said rod.

2. An artificial fish lure comprising a body component having an axial bore therethrough, a rod extending through said bore, said rod having first and second end portions projecting beyond related ends of the body component, a spinner component having an axial bore extending therethrough rotatably receiving one of said rod end portions, means on the rod limiting endwise movement of the spinner component along the related rod end portion, a single relatively long flexible blade having an inward end secured to a side of the spinner component and extending laterally outwardly from the spinner component, and a trailing fishhook assembly secured on an end of said rod, said inward end of the single blade having a reduced width tab thereon, and said spinner component having thereon an eye projecting laterally therefrom, said eye having a ring portion through which said tab is compressed and passed, said tab being wider than the ring portion and having a terminal end expanded at the side of the ring portion remote from the remainder of the blade and serving to retain the tab in the ring portion.

References Cited in the file of this patent

UNITED STATES PATENTS

| 1,871,387 | Pflueger | Aug. 9, 1932 |
| 1,920,676 | Burckhardt | Aug. 1, 1933 |

FOREIGN PATENTS

| 1,105,323 | France | Nov. 29, 1955 |